March 4, 1941.  A. I. EDDY ET AL  2,233,593
GALVANIC BATTERY
Filed Aug. 10, 1937
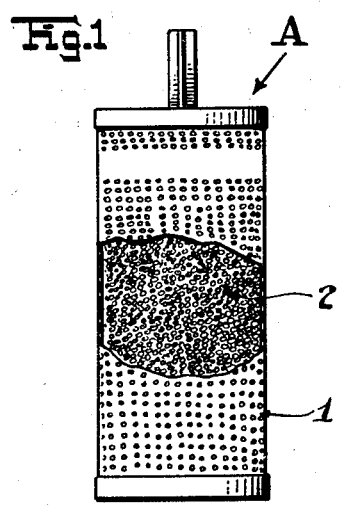
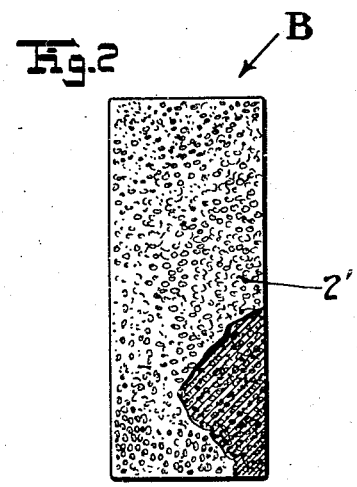
Inventor
Albert I. Eddy
Ernest O. Jegge
By Henry Lanahan
Attorney Patented Mar. 4, 1941

2,233,593

UNITED STATES PATENT OFFICE 2,233,593

GALVANIC BATTERY

Albert I. Eddy, Hillside, and Ernest O. Jegge, Glen Ridge, N. J., assignors to Thomas A. Edison, Incorporated, West Orange, N. J., a corporation of New Jersey Application August 10, 1937, Serial No. 158,338

1 Claim. (Cl. 136—121)

This invention relates to galvanic batteries and more particularly to an improved form of depolarizer electrode element or cathode for such batteries. While especially directed to batteries employing liquid electrolytes, the invention is also applicable to batteries employing paste electrolytes, commonly referred to as "dry cells," as well as to other types of dry cells.

The vast majority of all primary batteries which are produced and used commercially are provided with cathodes consisting of electrodes embodying or having closely associated with conductive elements thereof depolarizing material which in the operation of discharging the batteries, is chemically reduced so as to liberate oxygen. The oxygen so liberated combines or reacts with the hydrogen which is generated and gathers or tends to gather on the cathodes in the operation of discharging such batteries, thus preventing the latter from becoming polarized. Batteries, whether primary or storage, wherein depolarization is thus effected, may be aptly described as "chemical-depolarizable batteries" or as batteries which operate or the cathodes of which operate on the "chemical-depolarizing principle."

Notable examples of chemical depolarizable primary battery cells are the Lalande cell, in which the cathode comprises a mass of copper oxide as the depolarizing material, the anode is of zinc or amalgamated zinc and the electrolyte comprises a suitable caustic alkaline solution, such as a solution of sodium or potassium hydroxide, which may be either in a liquid or in a paste form; and the Leclanché cell which comprises a cathode generally consisting of a carbon element embedded in or having closely associated therewith a mass of depolarizing material or mix including peroxide of manganese, an anode of zinc and a suitable electrolyte which may be either in a liquid or paste form and which usually comprises a solution of sal ammoniac or of zinc chloride or of a combination of sal ammoniac and zinc chloride.

Certain types of chemical-depolarizable primary battery cells give results which are for the most part highly satisfactory under the various conditions of operation to which they are likely to be subjected in many fields of service; this being particularly true of primary cells of the Lalande type. For example, a properly constructed Lalande cell will give a fairly steady voltage whether discharged at a low rate or at a relatively high rate, and will also operate effectively at low and high temperatures. Moreover, high capacity cells of the Lalande type may readily be made in a compact form occupying but little space.

Another type of primary battery cell now used commercially to some extent, is that commonly referred to by the term "air-depolarized cell" or "air cell." In most primary cells of this character as now constructed no chemical depolarizing material is present, the cathodes comprise blocks of porous carbon, such as charcoal, which are specially treated to render them liquid-repellent without rendering the same impermeable to gases, the anodes are of zinc or amalgamated zinc and the electrolyte, which is sometimes in liquid form and sometimes in paste form, comprises a caustic alkaline solution such as a solution of sodium hydroxide. The cathodes of such cells project somewhat above the level of the electrolyte, this being necessary for the operation of all cells which function or whose cathodes function on the "air-depolarizing principle." Just what this "air-depolarizing principle" of operation is, has not been definitely determined. Some authorities claim that in the operation of discharging these air cells, the cathodes thereof continually absorb air from the outside atmosphere and that the occluded oxygen of the air thus absorbed coacts with the hydrogen at those surface portions of the cathodes exposed to the electrolyte to thereby effect depolarization of the cells; while other authorities advance the theory that the hydrogen generated in discharging the cells merely penetrates the gas-permeable porous cathodes and escapes therethrough to the outside atmosphere. However, regardless of what may be the correct principle of the depolarizing action of air-depolarizable cells or of the cathodes thereof, such principle will be hereinafter referred to at various points in this specification and in the claims, as the "air-depolarizing principle."

Air-depolarizable cells as now produced, however, are very definitely limited as to the conditions under which they will operate satisfactorily, with the result that the fields of service for these cells are considerable restricted. If the cathode of such a cell becomes wet, as by absorption of electrolyte, complete failure of the cell results; and some of the limitations referred to are due to the fact that it is practically impossible to maintain the porous carbon cathodes of these cells in a dry state under conditions of operation which are not infrequently encountered in many services for which batteries are ordinarily employed. For example, if such cells be discharged at a temperature appreciably below about 40°

Fahrenheit or at a temperature appreciably above about 120° Fahrenheit, the cathodes will almost invariably absorb such a quantity of electrolyte as to result in complete failure of the cells. These limitations of present-day air-depolarizable cells are well recognized in the art.

In addition air-depolarizable cells as a class are incapable of delivering high sustained discharge currents. By this it is meant that air-depolarizable cells of a given ampere-hour capacity can be discharged only at current rates which are very low as compared to those which the preferred types of chemical-depolarizable cells of the same ampere-hour capacity are capable of delivering.

Despite the above indicated shortcomings of air-depolarizing cells as now made, manufacturers, inventors, etc., have in recent years displayed much interest in cells of this character because of the attractive possibilities of the air-depolarizing principle of operation; and it is a fact that under those limited conditions which are favorable to air-cell operation useful and satisfactory results have been obtained by such cells.

All primary and storage batteries now known in the art, operate either on the chemical-depolarizing principle only or on the air-depolarizing principle only. There are, however, various services in which it would be highly desirable to use batteries designed to operate on the air-depolarizing principle if discharged under conditions suitable for such operation and to operate on the chemical-depolarizing principle if discharged under other conditions, or in other words, batteries which are combination air-depolarizable and chemical-depolarizable batteries. For example, it would be desirable to use such combination batteries or cells in services where conditions favorable to air-cell operation alternate with conditions unfavorable to such operation, or where the conditions of operation are not ascertainable in advance of the installation of the batteries. This is so for the reason that during such periods as conditions might be favorable to the operation of air-cells the combination batteries or cells would discharge current on the air-depolarizing principle without consumption of the chemical-depolarizing material; whereas during such periods as conditions might be unfavorable to air-cell operation the chemical-depolarizer in the combination cells would serve a dual purpose; first it would act to sustain depolarization by operation on the chemical-depolarizing principle, and second it would have the effect of relieving any harmful endosmotic pressure which would otherwise result in forcing electrolyte into the cathodes with fatal results to subsequent operation on the air-depolarizing principle. There are also services in which it would be desirable to employ a battery adapted to supply a certain desired voltage under one discharge condition and to supply either a higher or lower voltage under another discharge condition, which result can be obtained by the proper selection of chemical-depolarizing material. Moreover, certain other advantages would be derived from the use of batteries combining the air-depolarizing principle of operation and the chemical-depolarizing principle of operation, having nothing to do with voltage.

The principal objects of the present invention are to provide a new type of battery cell, namely a combination air-depolarizable and chemical-depolarizable battery cell; and also to provide an improved and novel form of duel-purpose depolarizer electrode element or cathode for use in such combination cells and which when embodied therein adapts the same for air-depolarizing operation under certain conditions and for chemical-depolarizing operation under other conditions.

Another important object of the invention is to provide such a combination cell which is capable of operating on the air-depolarizing principle, but which differs from all known types of air-depolarizing cells in that the intermittent imposition of unfavorable conditions fatal to air-cell operation does not permanently impair the ability of the cell for subsequent operation as an air-cell when conditions favorable therefor recur.

Other objects and features of the invention will be apparent from the following description and the appended claims.

In the drawing accompanying and forming a part of this specification:

Figure 1 is an elevational view, partly broken away, of one form of dual-purpose or combination electrode element in accordance with the invention; and Fig. 2 is a view similar to Fig. 1 of another form of such an electrode element.

Generally described, a depolarizer electrode element or cathode in accordance with this invention and adapted for use in our new type combination air-depolarizable and chemical-depolarizable battery cell, comprises a mass of a suitably proportioned mixture of a chemical-depolarizing material, preferably in a finely divided state, and an air-depolarizing electrode material. Such a cathode may be either of the so-called "basket" or perforated container type, in which case said mixture is packed or tamped into a perforated and preferably conductive container; or it may be of the self-sustaining type in which case the said mixture preferably has a suitable binding agent incorporated therewith, for example, molasses, and is agglomerated, as by pressing and baking, to a block, plate, cylinder or other desired form.

The electrode element A shown in Fig. 1, is an example of the "basket" type of element, referred to above, and comprises a perforated container 1 which is formed of a suitable conductive metal and is filled with a tamped or packed mass 2 consisting of a mixture of finely divided chemical-depolarizing material and air-depolarizing material.

Fig. 2 shows an electrode element B of the self-sustaining type, said element comprising a hard solid mass 2' consisting of a mixture of finely divided chemical-depolarizing material and air-depolarizing material which has been suitably agglomerated, as, for example, by pressing and baking in the manner above described.

The electrode elements A and B illustrated in Figs. 1 and 2 may be circular or rectangular or of any other desired shape in horizontal cross-section.

The chemical-depolarizing material employed in such depolarizer electrode elements or cathodes, is subject to wide variance and is largely dependent on the characteristics of the cells in which the cathodes are designed to be incorporated and on the services in which the cells are to be used. For example, this chemical-depolarizing material can be selected as may be desired, from the following group of substances: copper oxide, oxygen-containing nickel compounds such as those which have been used for the depolarizing material in galvanic batteries, manganese peroxide, cerium oxide, lead oxide and lead sulphate.

The voltage obtained upon discharging air cells, is substantially the same in the case of all cells, regardless of the air-depolarizing material or materials used in such cells. However, when any of a number of the chemical-depolarizing materials just mentioned is incorporated in our improved dual or combination battery cell and the latter operates on the chemical depolarizing principle, the voltage obtained is distinctly different from that which is typical of air cells. This result is obtained with our improved combination cell where the chemical-depolarizing material thereof consists of copper oxide or certain of the oxygen-containing nickel compounds or certain of the oxides of lead. The discharge voltage of such a combination cell when operating on the chemical-depolarizing principle may be either higher or lower than the voltage typical of air-cell operation, depending upon the particular chemical-depolarizing material employed. For example, if copper oxide is employed as such chemical-depolarizing material, the voltage obtained when the cell operates on the chemical-depolarizing principle will be materially below the voltage typical of air-cell operation; while if the chemical-depolarizing material consists of a high oxide nickel compound, the voltage obtained upon such operation of the cell will be appreciably higher than the typical air-cell voltage. For reasons hereinbefore set forth, we preferably employ in our combination cell one of the aforesaid chemical-depolarizing materials whereby the discharge voltage of the cell when operating on the chemical-depolarizing principle, will be distinctively different from that typical of air-cell operation. In addition to other advantages, it is possible where such a chemical-depolarizing material is employed in our cell, to determine at any time by a simple reading the voltage at which the cell is discharging and thereby obtain an indication of whether the cell is operating as an air cell or as a chemical-depolarizing cell. In many instances this would enable the user of the cell to so change the temperature or other conditions to which it is then subjected, as to effect a shifting of the cell from air-depolarizing operation to chemical-depolarizing operation, or vice-versa, as would sometimes be desirable.

The air-depolarizer electrode material of our improved dual-purpose cathodes, is also subject to wide variance. In general, any material or combination of materials may be used which when embodied in the cathodes of galvanic batteries, whether storage batteries or primary batteries, impart air-depolarizing properties thereto. For example, silica gel, any of a considerable number of metals in finely divided condition (the particular metal to be used being dependent to some extent upon the particular chemical-depolarizing material selected), and any of a great many carbonaceous materials including charcoal and other substances heretofore recognized as suitable for use in air-depolarizing cells, may be employed. The entire group of carbonaceous materials adapted to be used for this purpose, may conveniently be designated "air-cell carbon," and wherever this term is used either in this specification or the appended claim, it is to be understood that it is intended to cover thereby the entire group of carbonaceous materials just mentioned. Advantageous results are obtained by the use of that class of air-cell carbons which we choose to designate herein by the term "carbon black" which term as used herein, is intended to cover not only the materials commonly referred to in some industries as carbon blacks, but also soots, lamp-blacks, coal-tar-oil blacks, etc. There are many forms of these carbon blacks which are produced commercially, and the only definite way of determining which forms will give the best results when used as the air-depolarizer electrode material in combination with a given chemical-depolarizing material, is by actual trial. However, we find that it is generally preferable to employ a carbon black which is of such physical characteristics as to be inherently liquid-repellent and which will result in the production of cathodes having relatively large exposed surface areas and satisfactory electrical conductivity.

In producing the dual-purpose or combination depolarizer electrode elements or cathodes, both the chemical-depolarizer material and the air-depolarizer electrode material are preferably initially in a very finely divided state and combined in the form of a very intimate and substantially homogeneous mixture. Also the chemical-depolarizing material and the air-depolarizing electrode material are preferably combined in such amounts that the resulting electrode elements are capable of operating either on the chemical-depolarizer principle alone or on the air-depolarizer principle alone throughout the rated life of the cells in which such elements are designed to be used.

The following are examples of actual cells which have been made and successfully operated:

*Example 1.*—Fifteen parts by weight of finely divided copper oxide were combined with one part by weight of acetylene soot so as to produce a very intimate and substantially homogeneous mixture of the materials. This mixture was then tamped into a perforated metal container and the latter closed. A considerable number of cathodes made in this manner, were incorporated in cells having anodes of amalgamated zinc and a solution of sodium hydroxide as the electrolyte. In all cases the cathodes were disposed with the major portion thereof in the electrolyte and with the upper end portion extending slightly above the level of the electrolyte. These cells, which were each of 500 ampere-hour capacity, were first discharged at one-half an ampere, namely, at a current rate generally considered as suitable for air depolarizable cells of such capacity, and the voltage obtained was that typical of air-depolarizable cells of the same capacity. The discharge rate was thereafter increased six-fold, namely, to 3 amperes, whereupon the cells failed to operate as air-depolarizable cells. However, instead of a complete failure of the cells resulting, the voltage became typical of a zinc, copper oxide, alkaline electrolyte cell upon discharge thereof at such increased rate, and the cells continued to operate at this level. Subsequently the discharge rate was reduced to one-half an ampere, whereupon air-cell operation was restored as evidenced by the fact that the original characteristics were again exhibited.

*Example 2.*—Fifteen parts by weight of finely divided copper oxide, one part by weight of acetylene soot and a small quantitiy of molasses as a binding agent, were combined in the form of a very intimate and substantially uniform mixture. This mixture was then pressed into blocks and subsequently baked. The said blocks were then employed as the cathodes of cells having anodes of amalgamated zinc and a solution of sodium hydroxide as the electrolyte, with the major portion of the block or cathode of each cell disposed in the electrolyte and with the upper end portion thereof extending slightly above the level of the electrolyte. These cells were each of 500 ampere-hour capacity. The said cells were discharged under exactly the same conditions as the cells described in "Example 1" and the same results were obtained.

The cathodes of some of the cells made as described above in "Examples 1 and 2" had no independent liquid-repellent material or means incorporated therein or applied thereto; in such cells the inherent liquid-repellent property of the acetylene soot or air-depolarizing electrode material of the cathodes was relied upon for rendering and maintaining the latter liquid-repellent. The cathodes of other cells however, did have an additional or independent liquid-proofing means or material applied thereto consisting of the residue produced by the evaporation of ordinary kerosene; and it is preferable, as a precautionary measure, to apply this or any of the other well known additional liquid-proofing means or materials, such as paraffin, an oleate, a stearate, etc., to the cathodes of our combination cells. A considerable number of cells have also been made which were similar to those described in "Examples 1 and 2" above, except that in some other forms of air-cell carbon was substituted for the acetylene soot in the cathodes and in other cases chemical-depolarizers other than copper oxide were employed; and when these cells were discharged as described in "Examples 1 and 2," similar results were obtained.

It is to be understood that those embodiments of the invention specifically described herein are merely illustrative and that the same are subject to numerous changes and modifications without departure from the spirit of the invention or the scope of the appended claim.

We claim:

A depolarizer electrode element for a combination air-depolarizable and chemical-depolarizable battery cell, said element comprising an intimate mixture of solid air-depolarizing and chemical-depolarizing materials consisting respectively of substantially one part by weight of acetylene soot and substantially fifteen parts by weight of copper oxide, said element being initially liquid-repellent and gas-permeable and having such an amount of each of said materials that when the same is properly incorporated in such a cell, it is adapted during substantially the entire rated life of the cell, to operate substantially wholly on the air-depolarizing principle without appreciable consumption of the copper oxide whenever and so long as the cell is discharged under conditions of temperature and of current discharge rate favorable to air-depolarizing operation of the cell and to operate substantially wholly on the chemical-depolarizing principle whenever and so long as the cell is discharged under either a temperature or current discharge rate condition favorable to chemical-depolarizing operation and unfavorable to air-depolarizing operation.

ALBERT I. EDDY.
ERNEST O. JEGGE.